(12) United States Patent
Maeda et al.

(10) Patent No.: US 9,170,571 B2
(45) Date of Patent: Oct. 27, 2015

(54) POSITION CONTROLLER

(71) Applicant: OKUMA Corporation, Niwa-gun, Aichi (JP)

(72) Inventors: Masahiro Maeda, Aichi (JP); Satoshi Eguchi, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 16 days.

(21) Appl. No.: 14/260,896

(22) Filed: Apr. 24, 2014

(65) Prior Publication Data

US 2014/0320057 A1 Oct. 30, 2014

(30) Foreign Application Priority Data

Apr. 24, 2013 (JP) .................. 2013-091600

(51) Int. Cl.
*G05B 13/02* (2006.01)
*G05B 19/404* (2006.01)

(52) U.S. Cl.
CPC .......... *G05B 13/021* (2013.01); *G05B 19/404* (2013.01); *G05B 2219/41154* (2013.01)

(58) Field of Classification Search
CPC ....... B60L 15/20; B60L 2200/26; B60L 3/10; B60L 3/102; B60L 3/104; B60L 3/106; B60L 9/24; B60T 8/1705; G05B 11/42; G05B 13/02; G05B 5/01; G05B 19/19; G05B 19/404; G05B 2219/39178; G05B 2219/391
USPC ............ 318/560, 561, 568.1, 630, 632; 701/9
See application file for complete search history.

(56) References Cited

U.S. PATENT DOCUMENTS

| 4,765,573 | A | * | 8/1988 | Wells ........................... 244/3.15 |
| 5,216,342 | A | * | 6/1993 | Torii et al. .................. 318/568.1 |
| 7,560,890 | B2 | * | 7/2009 | Terada et al. ................. 318/630 |
| 8,285,430 | B2 | * | 10/2012 | Yabuuchi et al. ............... 701/19 |
| 2003/0201746 | A1 | | 10/2003 | Eguchi |
| 2007/0007927 | A1 | * | 1/2007 | Terada et al. ................. 318/630 |
| 2009/0302796 | A1 | * | 12/2009 | Minamide ..................... 318/630 |
| 2010/0179713 | A1 | * | 7/2010 | Yabuuchi et al. ............... 701/19 |

FOREIGN PATENT DOCUMENTS

JP 3840429 B2 11/2006

* cited by examiner

*Primary Examiner* — Paul Ip
(74) *Attorney, Agent, or Firm* — McCarter & English, LLP

(57) ABSTRACT

A position controller sets a variable friction compensation value which varies in accordance with a change in sliding characteristics by providing a variable friction compensation value calculation unit that includes a sliding torque normalization calculation unit that normalizes a sliding torque at a predefined speed; a compensation value amplifying ratio calculation unit that calculates a compensation value amplifying ratio based on the sliding torque at the normalized speed; and multipliers.

2 Claims, 2 Drawing Sheets

POSITION CONTROLLER

CROSS-REFERENCE TO RELATED APPLICATIONS

This application claims priority under 35 U.S.C. §1.119(a)-(d) to Japanese Patent Application No. 2013-091600, filed on Apr. 24, 2013, the content of which is incorporated herein by reference in its entirety as part of the present disclosure.

FIELD OF THE INVENTION

The present invention relates to a position controller that controls a position of a drive target in accordance with a command from a higher-level controller.

BACKGROUND OF THE INVENTION

FIG. 4 is a block diagram showing one example of a previously-known fully-closed position controller (hereinafter referred to merely as "position controller") that controls a position of a movably-formed target system 112 which comprises a movable member such as a table and is joined by coupling or the like to a servo motor (not shown) used as a drive motor.

The configuration and operation of the position controller are described below. The position controller receives an input of a position command value X from a higher-level device (not shown). A subtractor 101 calculates a positional deviation X−xL by subtracting a position detected value xL from the position command value X. The position detected value xL is a position detection signal which is obtained by directly detecting the position of a control target of the target system 112 by a linear scale or the like (not shown).

Further, a time derivative of the position command value X is obtained by differentiators 104, 109 which respectively output the obtained values as a speed command value V and an acceleration command value A. The acceleration command value A is amplified by an acceleration torque conversion constant Ca by an amplifier 110 to be used as an acceleration torque command value τca that causes the target system 112 to be moved at the rate of acceleration. The speed command value A and the acceleration torque command value τca are respectively added to the speed command and the torque command. Such a series of processes form a well-known feed forward block for reducing a constant positional deviation X−xL down to zero.

An amplifier 102 proportionally amplifies the positional deviation X−xL at an amplification factor of a position loop gain Gp. An output from the amplifier 102 becomes the final speed command value Vc after the speed command value V is added to the output by an adder 103. A subtractor 105 calculates a speed deviation Vc−vm by subtracting a motor speed vm from the speed command value Vc. The motor speed vm is a time derivative value, obtained by a differentiator 107, of a rotational angular position xm of a position detector (not shown) connected to a servo motor, or an output of a speed detector (not shown) connected to the servo motor. An amplifier 106 amplifies the speed deviation Vc−vm at an amplification factor of a speed loop gain Gv.

The output of the amplifier 106 becomes a torque command value τc after addition of an acceleration torque command value $\tau_{ca}$ by an adder 108. The torque command value $\tau_c$ becomes a generated torque τ for the target system 112 after being power amplified by a power amplifying unit 111. The power amplifying unit 111, which consists of a power amplifier and a servo motor, amplifies the torque command value $\tau_c$ to output the generated torque τ. The amplification ratio is represented by a torque conversion constant Ct. The generated torque τ is supplied to the target system 112 and used to drive the target system 112. It should be noted that, a reference symbol "S" of the differentiators in FIG. 4 represents a Laplace transform operator indicating a differential operation.

In previously-known position controllers, a positional follow-up deviation due to a frictional force is minimized by providing a friction compensation calculation unit 113 to respectively add compensation values $V_{sfc}$, $\tau_{sfc}$ calculated by the friction compensation calculation unit 113 to a speed command and a torque command.

However, when sliding characteristics of a target system are changed due to deterioration over time, a temperature change, a lubrication state change of a sliding surface, or the like, desirable friction compensation becomes impossible, causing a positional follow-up error and a decrease in processing accuracy. In order to avoid this, control parameters of the friction compensation calculation unit 113 should be reset (re-adjusted). Because resetting is time-consuming and is required every time the sliding characteristics change, resetting is troublesome.

Further, although changing control parameters of the friction compensation calculation unit 113 in accordance with a change in the sliding characteristics may be considered, because the sliding torque changes according to a traveling speed of the target system, it is necessary to compare sliding torques under the same speed in order to quantitatively handle the sliding torques. Therefore, it becomes necessary to obtain sliding toques by providing a dedicated operation mode, which would result in an increase of non-cutting time.

The present invention is provided to overcome these problems. An object of the present invention is to provide a position controller which can maintain desired friction compensation without a need to provide a dedicated operation mode even when sliding characteristics of a target system change due to deterioration over time, a temperature change, a lubrication state change of a sliding surface, or the like.

SUMMARY OF THE INVENTION

A position controller according to the present invention controls a position of a control target by providing a command to a drive motor of a control target system in accordance with a position command value from a higher-level controller. The position controller comprises a friction compensation calculation unit that calculates, based on a speed command value, a friction compensation reference value that is a reference value of a friction compensation value compensating a positional deviation due to a frictional force; a sliding torque normalization calculation unit that, with characteristic information indicating a relationship between a speed and a sliding torque stored in advance, calculates a sliding torque at a pre-defined normalized speed under a current state based on the speed command value, a torque command value, and the characteristic information; a compensation value amplifying ratio calculation unit that calculates a compensation value amplifying ratio that is an amplifying ratio of the friction compensation reference value based on a sliding torque at a normalized speed under the current state and a sliding torque at the normalized speed in an initial state; and an multiplier that multiplies the compensation value amplifying ratio by the friction compensation reference value to output the friction compensation value which compensates the positional deviation due to the frictional force.

In a preferred embodiment, the sliding torque normalization calculation unit comprises a sliding torque discrimination unit that outputs, based on the speed command value and the torque command value, a sliding torque at a speed indicated by the speed command value; a sliding torque ratio calculation unit that calculates, based on the characteristic information and the speed command value, a sliding torque ratio that indicates a ratio between the sliding torque at the speed indicated by the speed command value and the sliding torque at the normalized speed under the current state; and a speed-weighting calculation unit that calculates, based on the sliding torque ratio and the sliding torque at the speed indicated by the speed command value, the sliding torque at the normalized speed under the current state.

According to the present invention, because it is possible to vary a friction compensation value in accordance with a change in sliding characteristics by using a normalized sliding torque when sliding resistance characteristics of a target system change due to deterioration over time, a temperature change, a lubrication state change of a sliding surface, or the like, processing accuracy can be maintained without resetting (re-adjusting) control parameters of a friction compensation calculation unit.

BRIEF DESCRIPTION OF THE DRAWINGS

A preferred embodiment of the present invention will be described in detail by reference to the following figures, wherein.

DETAILED DESCRIPTION OF THE EMBODIMENTS OF THE INVENTION

Figure 1:
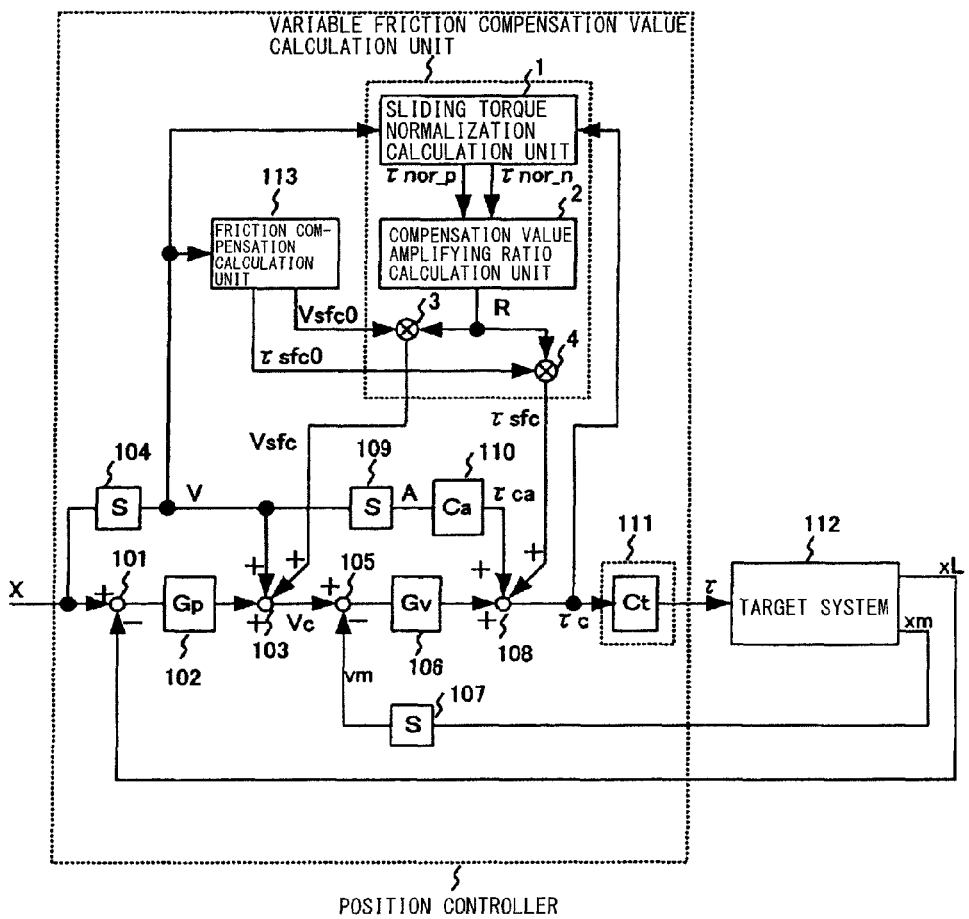
FIG. 1 is a block diagram showing one example of a position controller according to the present invention.
Figure 4:
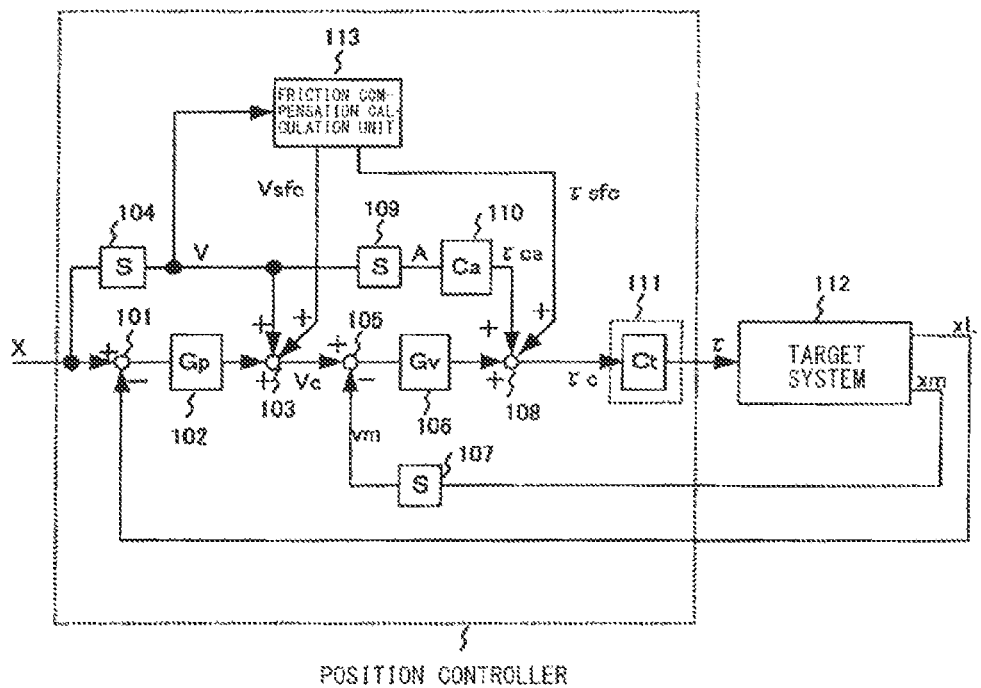
FIG. 4 is a block diagram showing one example of a previously-known position controller.

FIG. 1 is a block diagram showing an example of a position controller according to the present invention. It should be noted that the same reference numerals are assigned to the same elements as in the example of previously-known art shown in FIG. 4 and repeated descriptions of these elements are omitted. A variable friction compensation value calculation unit comprises a sliding torque normalization calculation unit 1, a compensation value amplifying ratio calculation unit 2, and multipliers 3, 4. First, the operation of the sliding torque normalization calculation unit 1 is described.

Figure 2:
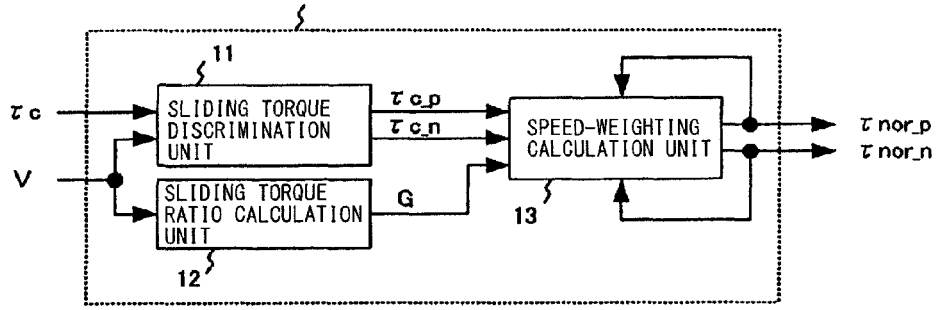
FIG. 2 is a block diagram showing an embodiment of a sliding torque normalization calculation unit according to the present invention.

FIG. 2 is a block diagram showing a configuration of the sliding torque normalization calculation unit 1. Because, generally, a sliding torque of a target system when driven has a positive correlation with a speed command value V, a change in the sliding characteristics should be obtained by comparing sliding torques at the same speed. Therefore, preset characteristic information between the speed command value V and the sliding torque, such as a sliding characteristic model which approximates a relationship between the speed command value V and the sliding torque, is set in advance and a certain sliding toque is converted to a sliding toque at the same speed (normalized speed) by using this model.

A sliding torque discrimination unit 11 receives an input of the speed command value V and a torque command value $\tau_c$; determines, as a sliding torque, a torque command value $\tau_c$ with which a target system 112 travels at a certain speed; further determines a traveling direction from the polarity of the speed command value V; and outputs a sliding torque $\tau_{c\_p}$ when traveling in the positive direction or a sliding torque $\tau_{c\_n}$ when traveling in the negative direction (hereinafter, the subscript "$_p$" indicates a positive direction, while the subscript "$_n$" indicates a negative direction). A sliding torque ratio calculation unit 12 receives an input of the speed command value V and outputs a sliding torque ratio G obtained by an operation described below.

Figure 3A:
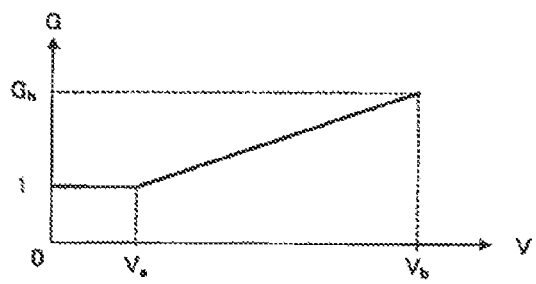
FIG. 3A is a graph describing an example of operation of a sliding torque.

FIGS. 3A and B show graphs describing an example operation of the above-mentioned sliding torque ratio calculation unit 12. FIG. 3A shows a sliding characteristic model with the horizontal axis showing the speed command value V and the vertical axis showing the sliding torque ratio G which is an output from the sliding torque ratio calculation unit 12. The sliding torque ratio G is a value showing a ratio of a sliding toque at a certain speed Vn with respect to a sliding torque at a normalized speed Va. The maximum speed Vb is a maximum speed of the target system 112. The normalized speed Va and the sliding torque ratio maximum value Gh are parameters which are determined based on the sliding characteristics (initial sliding characteristics) of the target system 112 obtained when selecting control parameters of the friction compensation calculation unit 113. The methods for determining the normalized speed Va and the sliding torque ratio maximum value Gh are described below.

Figure 3B:
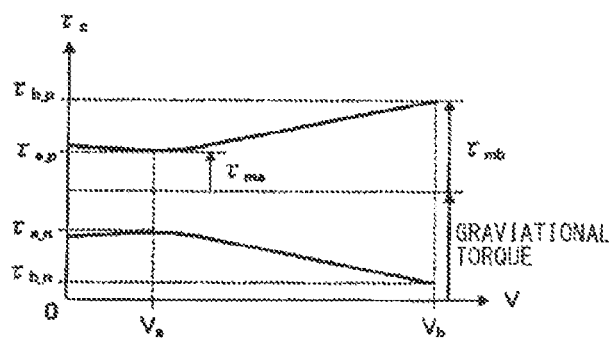
FIG. 3B is a graph describing an example of a ratio calculation unit according to the present invention.

FIG. 3B shows the initial sliding characteristics of the target system 112 (which are the sliding characteristics prior to deterioration over time, obtained when selecting control parameters of the friction compensation calculation unit 113). The normalized speed Va is a breakpoint when representing the initial sliding characteristics with one-point broken-line approximation. In FIG. 3B, $\tau_{a\_p}$ and $\tau_{a\_n}$ represent normalized speed sliding torque initial values, while $\tau_{b\_p}$ and $\tau_{b\_n}$ represent maximum speed sliding torque initial values. It should be noted that the normalized speed sliding torque initial value indicates a sliding torque at a normalized speed Va in an initial state.

The sliding torque ratio maximum value Gh is determined by the equation below by using $\tau_{ma}$ which is obtained by subtracting a gravitational torque from the normalized speed sliding torque initial value $\tau_{a\_p}$, and $\tau_{mb}$ which is obtained by subtracting a gravitational torque from the maximum speed sliding torque initial value $\tau_{b\_p}$.

$$Gh = \tau_{mb}/\tau_{ma} \qquad \text{(Equation 1)}$$

The sliding torque ratio calculation unit 12 determines the sliding torque ratio G which represents a ratio between a sliding torque at a normalized speed Va under a current state and a sliding torque at a speed indicated by the speed command value V from the equation below by using the above-mentioned parameters with an input of a speed command absolute value |V|, and outputs the determined sliding torque ratio G.

$$G = 1 \text{ (where } |V| \leq Va\text{)}$$

$$G = (Gh-1)/(Vb-Va)(|V|-Va)+1 \text{ (where } Va < |V| \leq Vb\text{)} \qquad \text{(Equation 2)}$$

A speed-weighting calculation unit 13 calculates normalized sliding torques $\tau_{nor\_p}$ and $\tau_{nor\_n}$ to be output from the equation below by using an input of a sliding torque ratio G, sliding torques $\tau_{c\_p}$ and $\tau_{c\_n}$, and previous values of sliding torques $\tau_{nor\_p}$ and $\tau_{nor\_n}$ at a normalized speed. The normalized sliding torques $\tau_{nor\_p}$ and $\tau_{nor\_n}$ indicate sliding torques generated during driving at a normalized speed Va under a current state (that is, after occurrence of deterioration over time, a temperature change, and a lubrication state change of a sliding surface).

$$\tau_{nor\_p} = \{\tau_{c\_p} - (\tau_{nor\_p}[n-1] + \tau_{nor\_n}[n-1])/2\}/G + (\tau_{nor\_p}[n-1] + \tau_{nor\_n}[n-1])/2$$

$$\tau_{nor\_n} = \{\tau_{c\_n} - (\tau_{nor\_p}[n-1] + \tau_{nor\_n}[n-1])/2\}/G + (\tau_{nor\_p}[n-1] + \tau_{nor\_n}[n-1])/2 \quad \text{(Equation 3)}$$

As described above, because the normalized sliding torque is obtained by normalizing sliding torques obtained at various speed commands, it becomes possible to compare sliding torques at the same speed (normalized speed Va) without providing an operation mode in which a speed is fixed.

Next, operations of the compensation value amplifying ratio calculation unit 2 are described. The compensation value amplifying ratio calculation unit 2 determines a compensation value amplifying ratio R to be output from the equation below by using an input of normalized speed sliding torque initial values $\tau_{a\_p}$, $\tau_{a\_n}$ and sliding torques $\tau_{nor\_p}$, $\tau_{nor\_n}$ at a normalized speed under the current state.

$$R = (\tau_{nor\_p} - \tau_{nor\_n})/(\tau_{a\_p} - \tau_{a\_n}) \quad \text{(Equation 4)}$$

It should be noted that although the compensation value amplifying ratio R is obtained by using the sliding torques $\tau_{nor\_p}$, $\tau_{nor\_n}$ at a normalized speed, a low pass filter may be applied to these sliding torques $\tau_{nor\_p}$, $\tau_{nor\_n}$ at a normalized speed in order to smooth the variations in the compensation value amplifying ratio R.

The multipliers 3, 4 output friction compensation values $V_{sfc}$, $\tau_{sfc}$ by multiplying the friction compensation values $V_{sfc0}$, $\tau_{sfc0}$ output from the friction compensation calculation unit 113 by the compensation value amplifying ratio R. In this way, it becomes possible to make the friction compensation value variable in accordance with a change in the sliding characteristics.

What is claimed is:

1. A position controller configured to control a position of a control target by providing a command to a drive motor of a control target system in accordance with a position command value from a higher-level controller, the position controller comprising:
  a friction compensation calculation unit configured to calculate, based on a speed command value, a friction compensation reference value that is a reference value of a friction compensation value compensating a positional deviation due to a frictional force;
  a sliding torque normalization calculation unit configured to calculate a sliding torque at a pre-defined normalized speed under a current state based on the speed command value, a torque command value, and characteristic information indicating a relationship between a speed and a sliding torque stored in advance;
  a compensation value amplifying ratio calculation unit configured to calculate a compensation value amplifying ratio that is an amplifying ratio of the friction compensation reference value based on a sliding torque at a normalized speed under the current state and a sliding torque at the normalized speed in an initial state; and
  a multiplier configured to multiply the compensation value amplifying ratio by the friction compensation reference value to output the friction compensation value which compensates the positional deviation due to the frictional force.

2. The position controller according to claim 1, wherein the sliding torque normalization calculation unit comprises
  a sliding torque discrimination unit configured to output, based on the speed command value and the torque command value, a sliding torque at a speed indicated by the speed command value;
  a sliding torque ratio calculation unit configured to calculate, based on the characteristic information and the speed command value, a sliding torque ratio that indicates a ratio between the sliding torque at the speed indicated by the speed command value and the sliding torque at the normalized speed under the current state; and
  a speed-weighting calculation unit configured to calculate, based on the sliding torque ratio and the sliding torque at the speed indicated by the speed command value, the sliding torque at the normalized speed under the current state.

* * * * *